United States Patent [19]

Ramin

[11] Patent Number: 5,408,903
[45] Date of Patent: Apr. 25, 1995

[54] SCREW GUN DRIVE

[75] Inventor: Wolfgang Ramin, Nuertingen, Germany

[73] Assignee: Karl M. Reich Maschinenfabrik GmbH, Nuertingen, Germany

[21] Appl. No.: 151,492

[22] Filed: Nov. 12, 1993

[30] Foreign Application Priority Data

Nov. 14, 1992 [DE] Germany .................... 42 38 537.7

[51] Int. Cl.6 ............................................ B25B 23/00
[52] U.S. Cl. ..................................... 81/57.37; 81/433
[58] Field of Search ..................... 81/57.37, 431–435

[56] References Cited

U.S. PATENT DOCUMENTS 4,625,597 12/1986 Cast .

Primary Examiner—D. S. Meislin
Attorney, Agent, or Firm—W. G. Fasse; W. F. Fasse

[57] ABSTRACT

A screw gun drive is adapted to adjust itself automatically to the pitch of the threading of the screw being driven. For this purpose a spindle-type spring biassed coupling is provided between the screw driving blade and the drive shaft of the motor. As a result of such a coupling the screw driving blade first begins a rotational movement when the drive motor is switched on, and then it superimposes an automatic axial feed advance which adapts itself to the pitch of the screw being driven. An adjustment member provides for adjusting the spindle coupling to the length of the screws being driven.

7 Claims, 2 Drawing Sheets

5,408,903

SCREW GUN DRIVE

FIELD OF THE INVENTION

The invention relates to a screw gun drive in which a motor driven screw driving blade is mounted in a guide housing for rotational and axial movement. A screw or spindle coupling is arranged between the screw driving blade and a motor driven drive shaft. The screw supply comes from a magazine.

BACKGROUND INFORMATION

U.S. Pat. No. 4,625,955 (Cast), issued on Dec. 2, 1986, corresponding to German Patent Publication (DE-OS) 3,333,427 (Cast), describes a screw driving gun in which a positive, controlled axial feed advance motion is imposed on the screw driving blade during the screw driving. This positive controlled feed advance is provided by an additional gear drive connecting a drive motor to a spindle screw which axially advances the screw driving blade. The known apparatus is especially suitable for driving screws which have a screw pitch that corresponds substantially to the pitch of the spindle screw that imposes the controlled axial feed advance. However, there is room for improvement when the just mentioned two pitches, namely that of the screw and that of the spindle screw, deviate from one another.

While using known screw guns, including the above described screw gun, the operator must increase the axial pressure applied to the tool as the driving of each screw progresses. This requirement becomes tiresome, especially where many screws must be driven for hours on end, for example when securing sheet rock to studs. This type of work becomes even more tiring if overhead applications are involved, for example, when sheet rock is applied to ceilings.

OBJECTS OF THE INVENTION

In view of the foregoing it is the aim of the invention to achieve the following objects singly or in combination:

- to construct a drive for a screw gun of the type described above in such a way that the feed advance motion of the screw driving blade is automatically adapted to the feed advance motion of the screw being driven, such screw feed advance motion depending on the pitch of the threading on the screw;
- to avoid damage to the work piece by driving any screw in accordance with the particular pitch of that screw, whereby the feed advance is automatically adapted to the screw pitch;
- to avoid increasing the axial pressure applied by the operator to the screw gun as the entry of the screw into the work piece progresses;
- to make the entire tool lighter and to avoid increasing an axial tool pressure during screw driving so that especially overhead screw driving work becomes easier;
- to enable the operator to always apply a constant, light pressure to the screw gun in use; and
- to make the screw gun drive more compact and less expensive by avoiding an extra gear drive.

SUMMARY OF THE INVENTION

The above objects have been achieved according to the invention by a screw gun drive, wherein a spindle coupling between a screw driving blade and a drive train is equipped with an entraining pin that cooperates with a spindle thread groove in a portion of the spindle coupling in such a manner that energizing of the drive motor which rotates the drive train, causes a rotation of the screw driving blade, and an axial blade feed advance motion that is responsive on the one hand to the drive power of the drive motor and on the other hand to the resistance that the screw being driven applies to the screw driving blade, whereby damage to a work piece is avoided. The spindle thread groove may be provided either in a coupling portion of a drive shaft or in a coupling portion of the screw driving blade. In both instances the axial feed advance is caused by a reaction force that is dependent on the resistance encountered by the screw entering the work piece. As the resistance increases so does the reaction force derived from the tool motor so that the operator does not have to increase the pressure manually applied to the screw gun.

Thus, according to the invention, the feed advance of the screw driving blade is not positively enforced, but rather it automatically adapts itself to the resistance that the screw being driven exerts on the screw driving blade, such resistance depending on the pitch of the particular screw being driven. As a result, damages to the work piece are avoided and any screw is driven without fault with less effort.

Another advantage of the screw gun drive according to the invention is seen in that it has a short structural length so that it may be used even in places where the available space is limited, such as in corners or the like. The present screw gun drive also does not require an extra or additional gear drive which not only makes the whole unit lighter, it also makes it less expensive and using the tool is less tiring.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
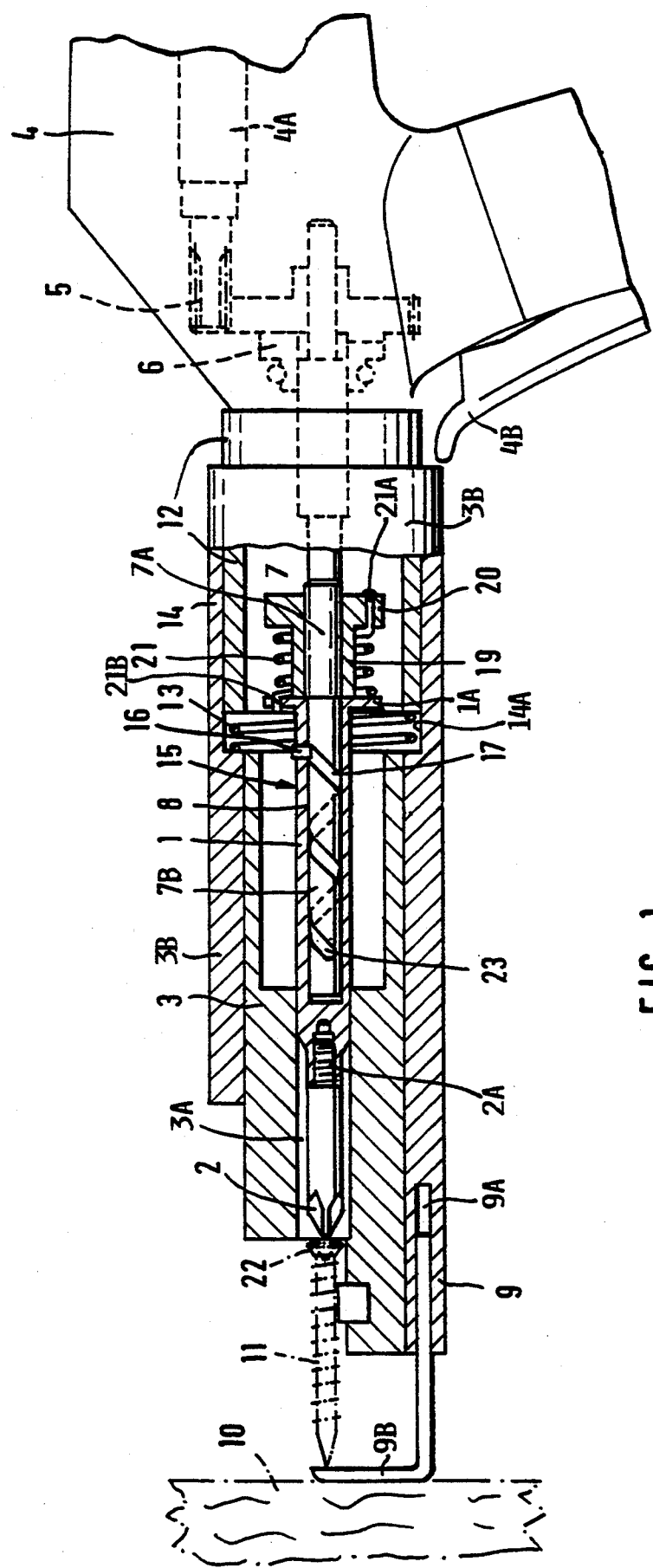
FIG. 1 is an axial sectional view through a first embodiment of a screw gun drive according to the invention.

FIG. 1 shows a screw-driver blade 1 having secured to its free end a screw driving bit 2, for example, by a threaded connection 2A for driving a screw 11 into a work piece 10. The driver blade 1 is axially guided in a guide channel 3A of a guide housing 3 which in turn is axially mounted in a bore of an outer housing 3B. The outer housing 3B has a sleeve section 14 with a guide bore 14A for a guided sleeve 12 to be described below.

A drive motor 4A mounted in an axially fixed position in a housing 4 drives through a gear 5 and a clutch 6 a drive shaft 7. The drive shaft 7 has a threaded portion 7A and a guided portion 7B received in an axial bore 8 of the screw driver blade 1. The guided portion 7B of the drive shaft 7 has a spindle thread groove 17 that is engaged by a cam follower or entraining pin 16 secured in and through the wall of the driver blade 1. The entraining pin 16 in cooperation with the spindle groove 17 forms a spindle coupling 15 in the bore 8 of the driver blade 1.

The outer housing 3B of the guide housing 3 carries a set down foot 9 which is pressed against the work piece 10 and which simultaneously functions for initially holding the screw 11 to be driven into the work piece 10. The housing 4 and thus the motor 4A are mounted to a guide bushing 12 that is slideably received in the guide bore 14A of the sleeve section 14 of the outer housing 3B. A compression spring 13 bears against a shoulder in the guide bore 14A on the one hand, and against the axially and inwardly facing end of the guide sleeve 12 on the other hand. The spring 13 is sufficiently stiff for the initial axial displacement of the guide sleeve 12, the housing 4, and the motor 4A toward the work piece 10 sufficiently for engaging the driver tip 2 in the screw head 22 and for the screw 11 to grip into the work piece 10. Once such gripping has started, further pressure applied by the operator is limited by the yielding of the spring 13.

In order to adjust the total axial driving stroke or feed advance of the present screw gun drive, an adjustment member 19 with an inner threading and with a radially extending, preferably outwardly knurled flange portion 20 is received on the threaded portion 7A of the drive shaft 7. A reset element such as a tension spring 21 is secured with its leg 21A to the flange portion 20. The other end 21B of the tension spring 21 is secured to a flange 1A of the driver blade 1. Rotation of the adjustment member 19 around the threaded portion 7A axially displaces the drive shaft 7 and thus the spindle groove 17 relative to the drive blade 1 in an axial direction to accommodate screws 11 of different lengths. The foot 9 is mounted in a hole 9A of the outer housing 3B. The foot 9 is axially adjustable in its position by loosening a set screw (not shown), properly positioning the foot 9, and tightening the set screw again.

The embodiment of FIG. 1 operates as follows. FIG. 1 shows the rest position. First, the foot 9 is set against the surface of the work piece 10. The foot 9 helps in guiding screws 11 from a magazine into a screw driving position. The foot 9 has a work piece contacting section 9B which is either in front of or behind of the screw being driven so that the foot 9 is not in the way of the screw. However, the foot 9 is so shaped and positioned that the foot 9 guides screws coming from a supply magazine (not shown) into axial alignment with the screw driving blade 1. The work piece contacting section 9B may have an opening large enough for a screw to pass through. In that case the foot section 9B with its opening is aligned with the blade 1.

When the motor 4A is switched on by operating the trigger 4B, the output drive shaft of the motor drives the shaft 7 through the engaged clutch 6 and the drive gear 5, whereby the driver blade 1 is first caused to rotate through the spindle coupling 15 with its entraining pin 16 engaged in the spindle groove 17.

The operator now presses the motor housing 4 and thus the guide bushing 12 against the guide housing 3 through the spring 13 which transmits an initial axial pressure sufficient for the phillips drive tip 2 to engage the phillips head 22 of the screw 11, thereby causing the screw 11 to rotate and to start gripping into the work piece 10. As the screw 11 continues to rotate, it penetrates into the work piece 10 and encounters a resistance against the drive torque applied to the screw. This resistance is trying to oppose the driving force coming from the motor 4A. As a result, a relative motion is present between the driver blade 1 and the drive shaft 7 so that the entraining pin 16 tends to travel along the spindle groove 17, thereby causing an axial feed advance motion of the driver blade 1. This feed advance motion of the driver blade 1 automatically adapts itself precisely to the pitch of the threading of the screw 11 being driven, and this adaptation continues until the entraining pin 16 bears against the end 23 of the spindle groove 17. At this point a substantial torque moment is developed which disengages or opens the clutch 6 so that the drive spindle 7 is disengaged from the drive motor 4A. At this point the screw 11 is fully driven into the work piece 10 and the reset member 21 in the form of a tension spring causes the driver blade 1 to return into its starting or rest position, whereby the adjustment member 19 again rests against the flange 1A of the driver blade 1 as shown in FIG. 1. Due to this control of the axial feed advance the screw cannot act as a drill bit and is thus prevented from damaging the work piece 10.

Figure 2:
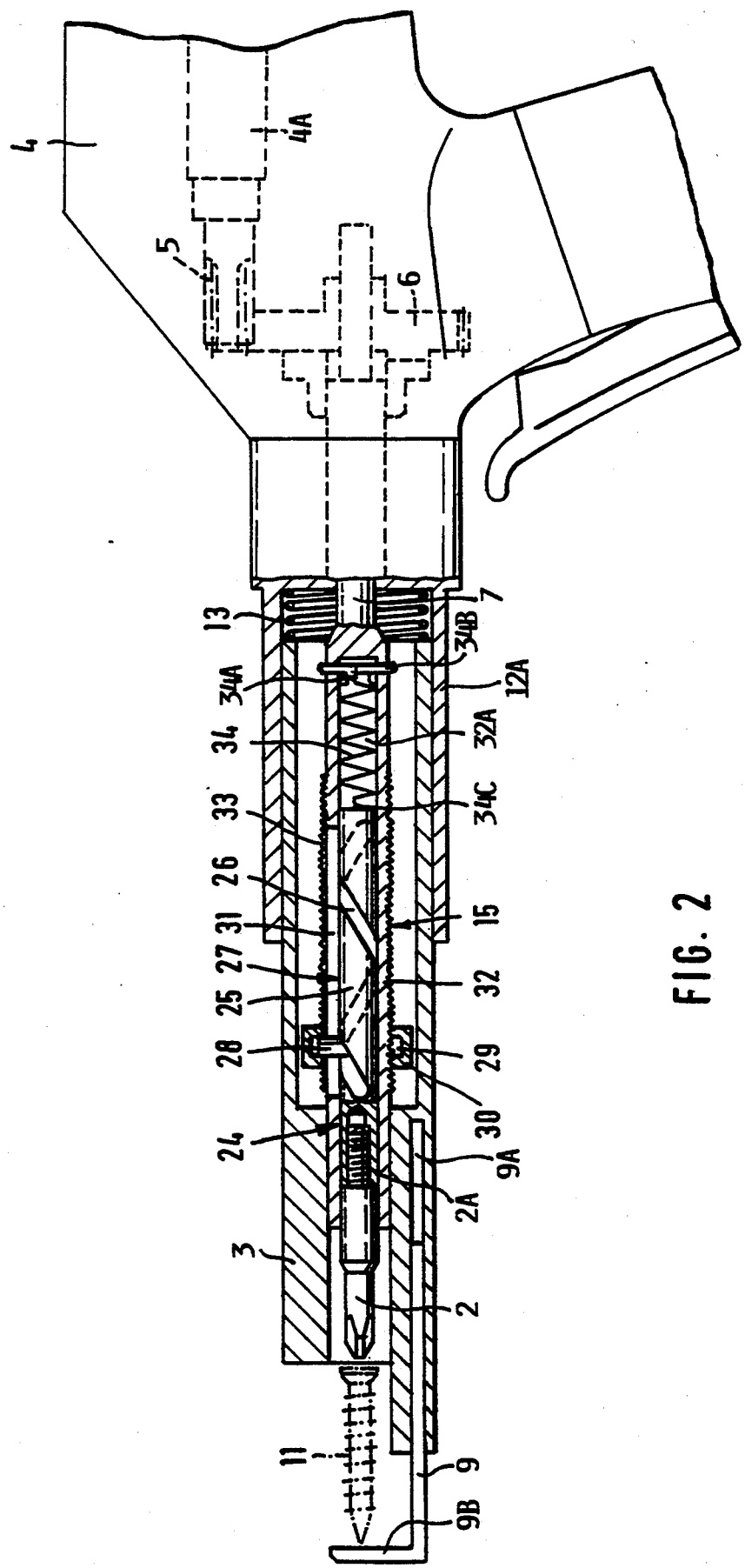
FIG. 2 is a view similar to that of FIG. 1, however showing a second embodiment.

FIG. 2 shows a second embodiment in which the same components are provided with the same reference numbers. In FIG. 2 the driver blade 24 is received in an axial bore 32A of a drive shaft 32 having an outer threading 33. The coupling section 25 of the drive blade 24 has a helical spindle groove 26 that forms together with an entraining pin 28 a spindle or screw coupling 27. The entraining pin 28 travels in the spindle groove 26 and its radially outer end engages into a ring groove 29 of an adjustment member 30, such as a knurled nut that has an inner threading engaging an outer threading 33 on the drive shaft 32. The drive shaft 32 has a longitudinal slot 31 in which the entraining pin 28 can be moved axially back and forth to position it lengthwise in the slot 31 to form the coupling 27 by the spindle groove 26 in combination with the entraining pin 28. When the adjustment member 30 is rotated around the drive shaft 32, thereby engaging the outer threading 33 of the drive shaft 32, the entraining pin 28 is moved either to the right or to the left in the axial direction in the slot 31. The coupling section 25 of the drive blade 24 is guided inside the bore 32A of the drive shaft 32.

A reset spring 34 is also mounted in the axial bore 32A of the drive shaft 32. The right-hand end 34A of the spring 34 is secured by a cross-pin 34B to the drive shaft 32. The left-hand end 34C of the spring 34 is secured to the coupling section 25 of the driver blade or driving blade 24.

The above mentioned spring 13 of FIG. 1 is also used in FIG. 2, and is located between the axially facing right-hand end of the guide housing 3 and a guide bushing 12A that performs the same function as the bushing 12 in FIG. 1.

The above mentioned adjustment member 30 is preferably a knurled nut that is accessible from the outside for rotation along the threading 33 of the drive shaft 32 for adapting the axial driving stroke of the driver blade 24 to different screw lengths of the screw 11.

The operation of the embodiment of FIG. 2 is substantially the same as the function described above with reference to FIG. 1. In both embodiments working with a screw gun comprising the present drive is made easier and fatigue is reduced, since the operator merely has to set the foot 9 against the work piece without applying a continuously increasing axial pressure for each screw being driven. Thus, a screw gun with the present drive is especially suited for use in driving a multitude of screws, for example, for attaching sheet rock and for overhead screw driving. Further, avoiding a second drive for the axial feed advance makes the tool shorter, lighter, and less expensive than conventional tools of this type. By conforming the feed advance to the pitch of the screw thread the screw is positively prevented from acting as a drill bit, which is also an advantage of the invention.

Although the invention has been described with reference to specific example embodiments, it will be appreciated that it is intended to cover all modifications and equivalents within the scope of the appended claims.

What I claim is:

1. A screw gun drive, comprising a guide housing (3), a screw driving blade (1, 24) mounted in said guide housing (3) for rotational and axial movement in said guide housing, a drive motor (4A) and a drive train (5, 6, 7, 32) driven by said drive motor, a spindle coupling (15, 27) operatively interposed between said drive train and said screw driving blade (1), said spindle coupling (15, 27) comprising an entraining member (16, 28), a spindle thread groove (17, 26) engaged by said entraining member (16, 28) for transmitting a controlled drive torque to said screw driving blade through said spindle coupling when said motor is energized and for simultaneously applying an axial feed advance force to said screw driving blade (1) as a reaction force to a resistance encountered by a screw (11) being driven into a work piece by said screw driving blade so that said feed advance force is controlled by said resistance encountered by said screw.

2. The screw gun drive of claim 1, further comprising reset means (21, 34) operatively arranged between said drive train and said screw driving blade for returning said screw driving blade into a rest position when said drive motor is switched off.

3. The screw gun drive of claim 1, further comprising adjustment means (19, 30) operatively interposed between said screw driving blade and said drive train for adjusting an axial position of said screw driving blade relative to said drive train to accommodate screws of different lengths.

4. The screw gun drive of claim 1, further comprising a guide bushing (12, 12A) connected to said drive train, said guide bushing being slideably mounted to said guide housing (3), and a compression member (13) interposed between said guide housing (3) and said guide bushing (12, 12A) so that said drive train and said guide bushing are axially displaceable relative to said compression member (13) which aids said drive train in returning into a rest position.

5. The screw gun drive of claim 1, wherein said spindle thread groove (17) is positioned in a surface of a coupling section (7B) of said drive train, and wherein said entraining member (16) is received in a radial bore of said screw driving blade (1) which also has an axial bore in which said coupling section (7B) is received for axial and rotational movement, said entraining member (16) reaching radially into said spindle thread groove.

6. The screw gun drive of claim 1, wherein said spindle thread groove (26) is positioned in a coupling portion (25) of said screw driving blade (24), and wherein said entraining member (28) is received in an axial slot (31) of a drive shaft (32) of said drive train, said entraining member (28) reaching radially into said spindle thread groove (26) and into said axial slot (31).

7. The screw gun drive of claim 6, further comprising an external threading (33) on said drive shaft (32), an adjustment threaded nut (30) engaging said external threading (33), said nut having a radial groove (29) open radially inwardly to receive a radially outer end of said entraining member (28) in said groove (29) whereby an axial position of said entraining member (28) along said axial slot (31) is adjustable by turning said nut (30) on said external threading (33).

* * * * *

UNITED STATES PATENT AND TRADEMARK OFFICE
CERTIFICATE OF CORRECTION

PATENT NO. : 5,408,903

DATED : April 25, 1995

INVENTOR(S) : Ramin

It is certified that error appears in the above-identified patent and that said Letters Patent is hereby corrected as shown below:

Column 1, line 13, replace "4,625,955" by --4,625,597--.

Signed and Sealed this

Eighteenth Day of July, 1995

Attest:

BRUCE LEHMAN

*Attesting Officer*  *Commissioner of Patents and Trademarks*